Nov. 21, 1950   W. F. KENLY   2,530,470
SPOON HOLDER ATTACHMENT FOR CULINARY VESSELS
Filed April 13, 1949
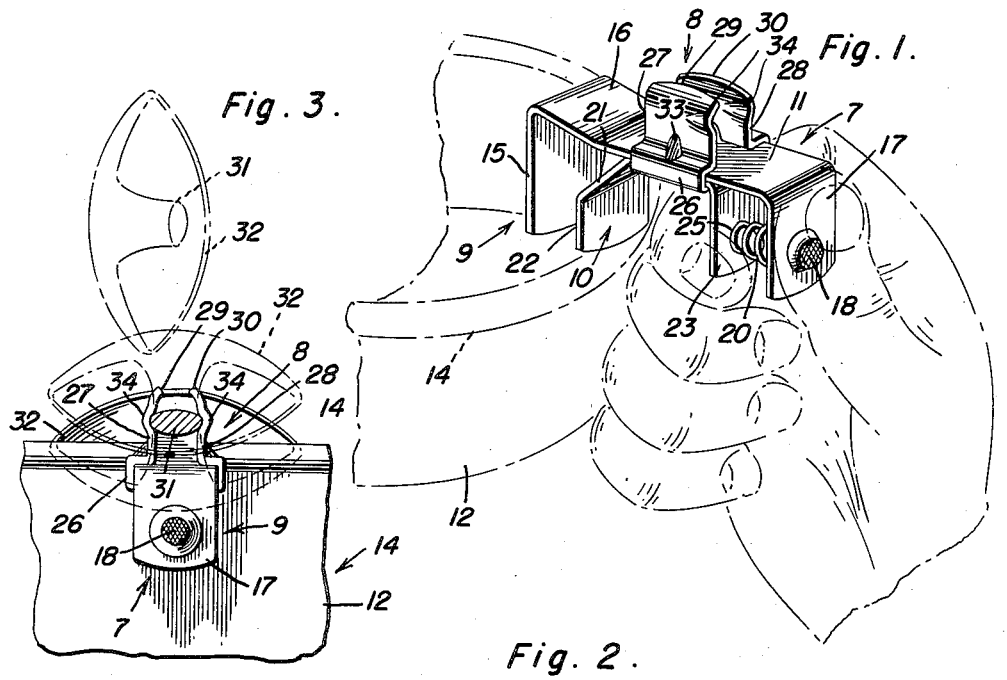
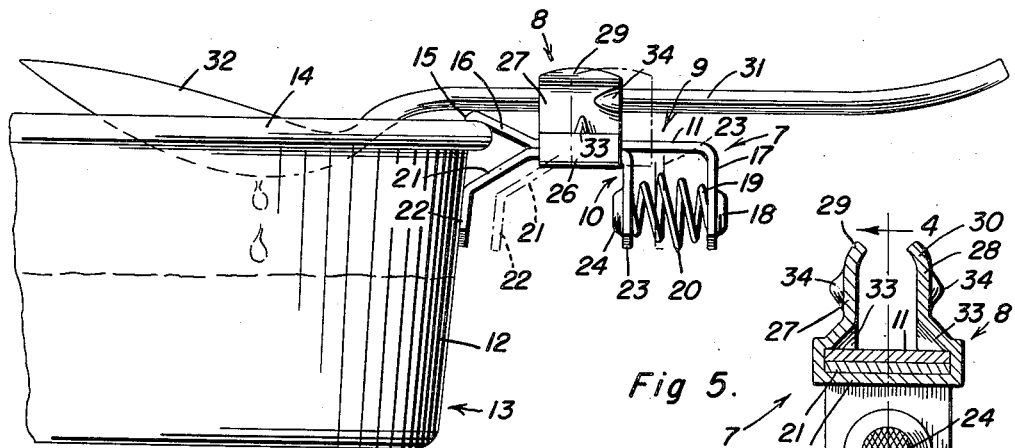
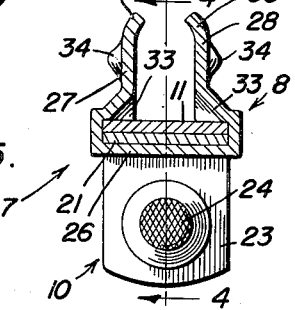
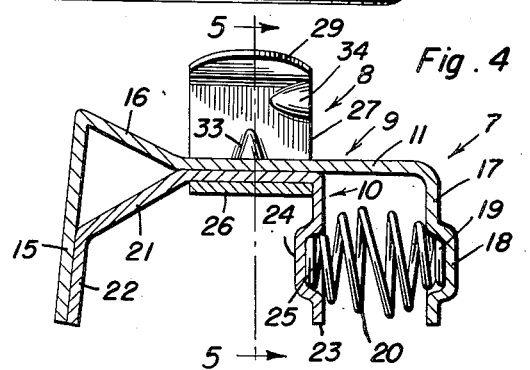
Inventor
Wilmer F. Kenly
By Clarence A. O'Brien
and Harvey B. Jacobson
Attorneys Patented Nov. 21, 1950

2,530,470

UNITED STATES PATENT OFFICE 2,530,470

SPOON HOLDER ATTACHMENT FOR CULINARY VESSELS

Wilmer F. Kenly, York, Pa.

Application April 13, 1949, Serial No. 87,248

3 Claims. (Cl. 65—65)

1

The present invention relates to a novel accessory which takes the form of a so-called attachment and which is applicable to the rim or wall of mixing bowls, cooking utensils, and the like, and is adapted to hold a spoon with its bowl-portion so that drippings therefrom will gravitate into the receptacle portion of the stated utensil.

Needless to say, I am conversant with the present state of the prior art and am, therefore, aware that many and varied types and styles of spoon-holding attachments have been put forth for use by others engaged in this line of endeavor. It follows, therefore, that an object of the instant invention is to structurally, functionally and otherwise improve upon spoon-holding attachments which have come to my attention.

Another object of the invention is to provide a utensil-type spoon holding attachment which is such in construction and styling that it serves to hold the spoon securely in a well elevated plane in relation to the rim of the vessel or utensil, keeps the spoon in a horizontal or a level plane and virtually insures effective drainage from the bowl portion of the spoon whether latter is "up" or "down," as the case may be.

In carrying out my aims and reducing to practice a preferred embodiment of the stated attachment, I have found it expedient and practicable to employ a clamping fixture which neatly and amply clamps itself on the vessel rim and which remains reliably in place and provides an efficient support for a novel spoon adapting and holding clip.

In addition, it is equally an important object to so design and make the stated adapter clip that it facilitates applying and removing the spoon and insures effective retention and maintenance of latter when the spoon takes its drainage position over the utensil.

A still further object has to do with the adoption and use of a double-pawed fixture wherein the jaws are held in coacting utensil-gripping relationship by a coiled spring which is advantageous for its jaw-retentive purposes but, in addition, radiates heat and minimizes transference of heat from the adapter clip to the spoon which is held in said clip.

Other objects and advantages will become more readily apparent from the following description and the accompanying illustrative drawings.

In the drawings, wherein like numerals are employed to designate like parts throughout the same:

Figure 1 is a perspective view of a spoon holder attachment constructed in accordance with the principles of the present invention showing, in phantom lines, the manner in which same is held and associated with a cooking utensil or the like.

Figure 2 is an elevational view showing the at-

2 tachment on the utensil, the spoon clamped therein for drainage purposes and showing, in dotted lines, the mode of releasing the outer jaw unit.

Figure 3 is an end view of the structure seen in Figure 2, looking at same in a direction from right to left and showing the shank or handle of the spoon in section.

Figure 4 is a central longitudinal sectional view taken on the line 4—4 of Figure 5, looking in the direction of the arrows.

Figure 5 is a cross-section on the line 5—5 of Figure 4, looking in the direction of the arrows.

Reference is had now to the drawings by reference numerals and lead lines, and it will be seen that the attachment is characterized, essentially speaking, by two complemental parts; namely, a clamp-on type utensil fixture 7 and a companion spoon adapter clip 8. The fixture 7 is characterized by a substantially U-shaped main jaw unit 9 and a complemental auxiliary jaw unit 10, the latter also being approximately U-shaped in general appearance. The bight portion 11 of unit 9 is adapted to arch over the rim or wall 12 of the vessel or other cooking utensil (mixing bowl or the like) 13. The rim 12 is shown provided with a bead 14 but this is of no particular consequence so far as the invention is concerned. The inner end portion of the unit 9 is downbent and thus fashioned into what may be called an inner clamping jaw 15 which joins to the bight 11 by a slightly inclined reach portion 16. The outer depending end portion 17 constitutes a finger-piece and has an indentation forming a reception and retaining cup 18 for the smaller end-coils 19 of the coiled expansion spring 20. Incidentally, the surface of the cup 18 forms a sort of a button and is appropriately knurled, milled, or otherwise roughened as shown in the drawings.

The auxiliary jaw unit 10 is of smaller U-shaped form and its bight portion includes a downwardly inclined reach 21 which is in divergent relation to the reach 16. The complemental downbent end 22 constitutes a jaw and is opposed to the jaw 15 and may be referred to as the outer jaw. The remaining laterally bent end 23 also has an indentation defining a spring cup 24 and here again this cup constitutes a button and is suitably knurled. Thus, the cupped end portion 23 forms a finger-piece which is opposed to the finger-piece 17 and the cup serves to accommodate the coacting small coils 25 of the spring.

The U-shaped adapter clip 8 comprises a slide 26 which is rigidly secured to and movable with the relatively slidable unit 10 but slidably embraces and rides back and forth on the bight portion 10 of the unit 9. The upstanding spoon-holding fingers of the clip are denoted by the numerals 27 and 28 and these have their extremities or free end portions inturned toward each other as at 29 and 30 to function as guards for the handle portion 31 of the spoon 32. Incidentally, the numerals 33 in Figure 4 designate indentations which form reinforcing members and which insure effective assembling of the clip for slidable movement on the bight portion 11 of the clamp unit 7. Additional indentations are provided at 34 and these function as keeper seats for edge portions of the handle part of the spoon. To insert the spoon, the handle portion is placed edgewise, as shown in dotted lines in Figure 3, which allows it to slip down between the closely related guards 29 and 30. Then it is given a quarter turn so that the edge portions of the handle are fitted between the fingers 27 and 28 and, as a matter of fact, rested in the keeper seat 34. The spoon is removed by reversing the procedure just described. It is to be pointed out in this connection that the bowl of the spoon may be placed with the receptacle side down or the receptacle side up whichever is preferred. In any event, the spoon is securely anchored and effective drainage is at all times insured.

In using the device, the unit 7 is applied and removed as illustrated in Figure 1. This is accomplished by placing the thumb, let us say, against the button 18 and the index finger against button 24. Now, by pressing the buttons toward each other against the tension of the intervening coiled spring 20, the jaws 15 and 22 separate and are then either attachable to or detachable from the wall of the utensil, as is doubtless evident from the drawings. Fig. 1 may represent the step of either applying or removing unit 7. Fig. 2 brings out the relationship of the two units 7 and 8 when they are in working position and, as a matter of fact, holding the spoon over the receptacle portion of the utensil 13 as shown. The bowl 32 of the spoon may be either "up" or "down," as is obvious. Also, and as stated, the shank portion of the handle of the spoon is turned edgewise and inserted between the grips 27 and 28 and is seated in the detents or keepers 34 as shown in full lines in Fig. 3. The grips 27 and 28 are sufficiently resilient to facilitate the steps of inserting and removing and retaining, and accidental displacement is minimized by the inturned guards 29 and 30.

With further reference to the inclined portion 16 of unit 9, the inclination is to obtain a lower position of grips 29—30 so as not to interfere with the act of stirring and also clear the marginal rim of cover, if one is to be used, without removing fixture from utensil.

Since various types of spoon holders have been patented and used by others, I deem it unnecessary to dwell at length upon the need for such devices or the advantages derived by having a spoon holder in the kitchen and handy for desirable usage.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A spoon holding attachment of the class shown and described comprising an inverted U-shaped unit including a bight portion and lateral end portions, one end portion forming a jaw and the other end portion a finger-piece, a second inverted U-shaped unit mounted within the confines of the first-named unit and having a bight portion in slidable contact with the first-named bight portion, one lateral end portion forming a jaw opposed to the first-named jaw, and a second lateral end portion forming a finger-piece opposed to the first-named finger-piece, said finger-pieces having indentations forming spring cups, a spring interposed between the finger-pieces and having its ends seated in said cups, and a spoon retaining clip mounted on and embracing the stated bight portions of said V-shaped units.

2. A spoon holding attachment of the class shown and described comprising an inverted U-shaped unit including a bight portion and lateral end portions, one end portion forming a jaw and the other end portion a finger-piece, a second inverted U-shaped unit mounted within the confines of the first-named unit and having a bight portion in slidable contact with the first-named bight portion, one lateral end portion forming a jaw opposed to the first-named jaw, a second lateral end portion forming a finger-piece opposed to the first-named finger-piece, said finger-pieces having indentations forming spring cups, a spring interposed between the finger-pieces and having its ends seated in said cups, and a spoon retaining clip, said clip being U-shaped and having its bight portion embracing the bight portions first-named and having end portions forming grips and said grips having inturned terminals.

3. A spoon holding attachment of the class shown and described comprising an inverted, U-shaped unit including a bight portion and lateral end portions, one end portion forming a jaw and the other end portion a finger-piece, a second inverted U-shaped unit mounted within the confines of the first-named unit and having a bight portion in slidable contact with the first-named bight portion, one lateral end portion forming a jaw opposed to the first-named jaw, a second lateral end portion forming a finger-piece opposed to the first-named finger-piece, spring means interposed between and connected with said finger-pieces, and a U-shaped spoon retaining clip, the bight portion of said clip being superimposed against and rigidly connected to the bight portion of the second-named U-shaped unit, the limbs of said clip being bent around the bight portion of the first-named U-shaped unit, whereby to slidably join said units together and to provide means for grasping and retaining the handle of a spoon.

WILMER F. KENLY.

REFERENCES CITED

The following references are of record in the file of this patent:

UNITED STATES PATENTS

| Number | Name | Date |
| --- | --- | --- |
| 148,355 | Dennett | Mar. 10, 1874 |

FOREIGN PATENTS

| Number | Country | Date |
| --- | --- | --- |
| 14,336 | Great Britain | of 1896 |